United States Patent [19]
McGahee

[11] 4,229,899
[45] Oct. 28, 1980

[54] VARIABLE DEPTH FISHING LURE SYSTEM

[75] Inventor: Welbourne D. McGahee, Melbourne, Fla.

[73] Assignee: Loop-A-Line, Inc., Melbourne, Fla.

[21] Appl. No.: 23,681

[22] Filed: Mar. 26, 1979

[51] Int. Cl.³ ............................................. A01K 85/00
[52] U.S. Cl. ................................ 43/42.09; 43/42.22; 43/42.39
[58] Field of Search ................. 43/42.08, 42.09, 42.22, 43/42.39, 43.14, 44.81, 42.44, 44.83, 44.86; 24/201 HE, 230 TC, 230 R, 231, 236

[56] References Cited

U.S. PATENT DOCUMENTS

| | | | |
|---|---|---|---|
| 1,727,936 | 9/1929 | Pflueger | 43/42.08 |
| 2,263,743 | 11/1941 | Shope | 43/42.08 |
| 3,009,279 | 11/1961 | Jacobson | 43/42.09 |
| 3,059,372 | 10/1962 | Hagel | 43/42.09 |
| 3,698,119 | 10/1972 | Levoin | 43/42.08 |
| 4,006,551 | 2/1977 | Messacar | 43/42.22 |
| 4,095,315 | 6/1978 | McGahee | 24/230 A |
| 4,112,608 | 9/1978 | McGahee | 43/42.09 |

*Primary Examiner*—Nicholas P. Godici

[57] ABSTRACT

A fishing system is presented wherein a fishing lure may be made to operate at predetermined optimum depths as a function of changes in the effective density of the fishing lure assembly which is accomplished by the selective use of hooks, having predetermined weights, attached to the lure by hook hangers which utilize a bore formed in the lower body as part of the connection mechanism.

14 Claims, 22 Drawing Figures

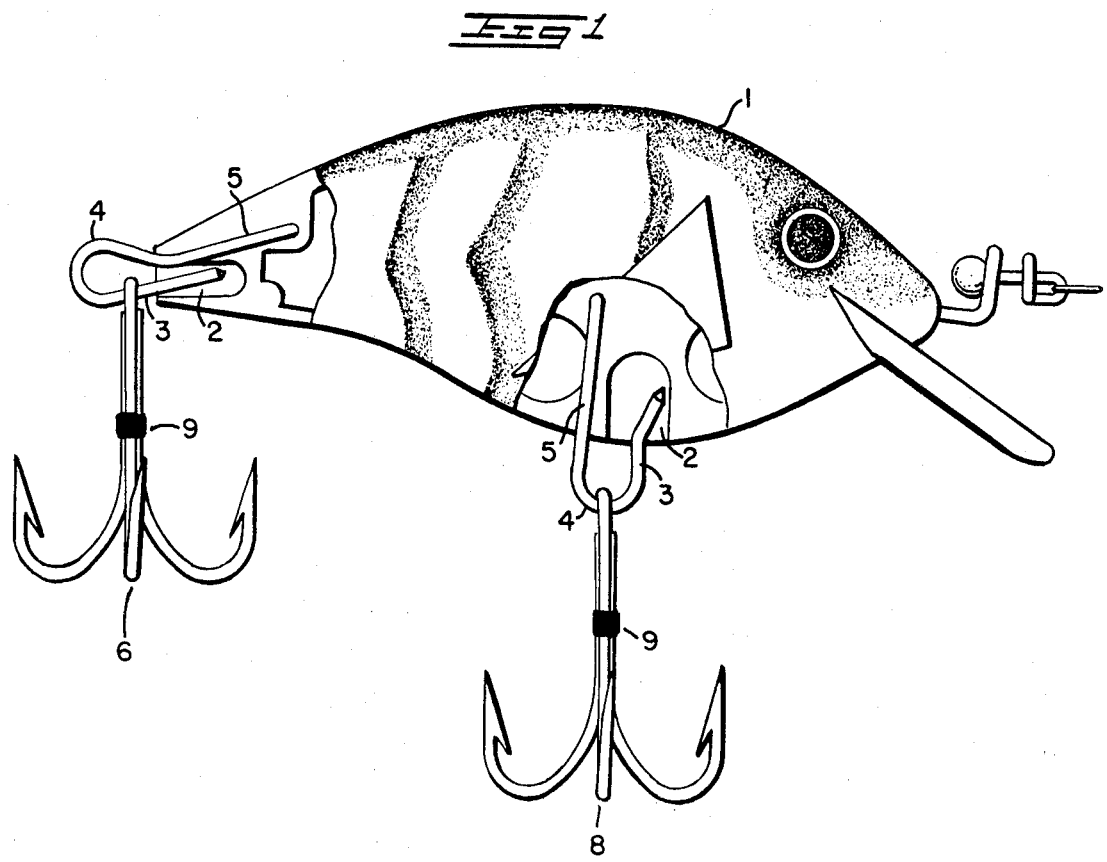

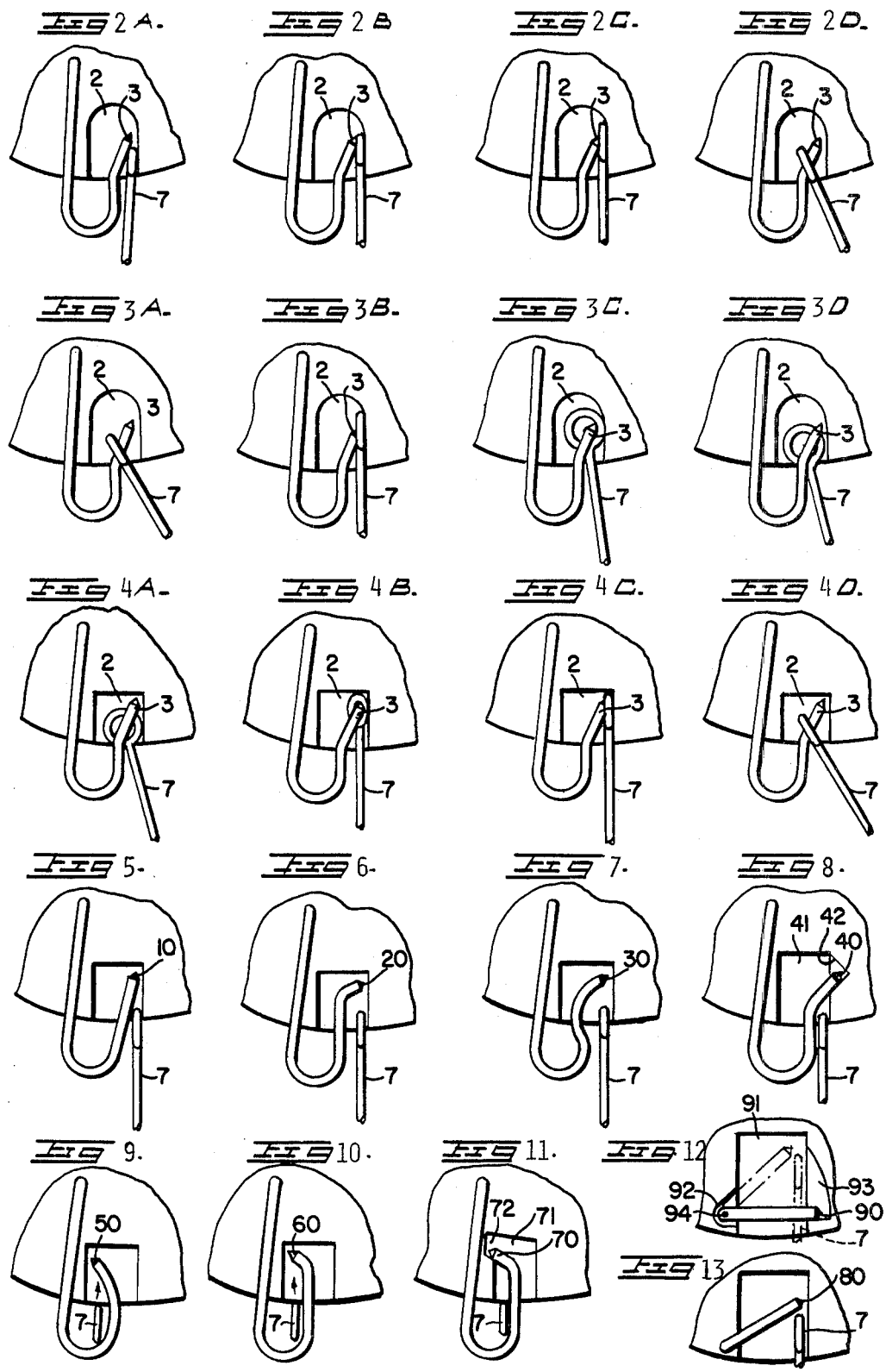

VARIABLE DEPTH FISHING LURE SYSTEM

THE INVENTION

This invention relates to fishing lures which incorporate quick release hook hangers that facilitate changing hooks on the lower body from a selection of hooks having various weight factors calculated to cause the fishing lure used therewith to achieve neutral buoyancy at predetermined depths in fresh or salt water.

BACKGROUND OF THE INVENTION

Fish feed at different depths as a function of food availability, water temperature, salinity and a wide variety of environmental factors. This necessitates that a successful fisherman present his bait to the fish at the depth at which they are currently feeding. This is not always possible when artificial baits are used because the artificial bait or lure which has the most appealing motion through the water for the particular species of fish being sought may not operate properly at the depth at which the fish are.

Artificial baits or fishing lures used for trolling, casting, or jigging are designed to operate at predetermined depths. The depth of operation of a fishing lure is a function of the density of the lure assembly, its hydrodynamic shape and speed of forward motion. Lure density and shape are fixed during manufacture so the depth at which it will operate properly is fixed and a user cannot vary the operating depth of a lure to place the lure at the same depth as the fish. In some cases a lure may be made to dive deeper or shallower by varying the retrieval rate but the shape of a lure dictates that it should be retrieved or trolled at a set speed to achieve the most lifelike action. Thus, a successful fisherman must have a large variety of fishing lures designed to operate at various depths at which fish may be found and in many cases a lure having the proper motion through the water does not have the proper density and therefore the lure which should be most successful in attracting fish fails to reach them.

OBJECT OF THE INVENTION

Therefore, it is an object of the present invention to provide a means whereby the effective density of a fishing lure may be changed so that the lure may be properly presented to the fish regardless of the depth at which they are feeding.

A further objective of the present invention is to provide a fishing lure system in which the fishing lure has a plurality of replacable hooks having different weights so that the weight of the hook may be used to vary the effective density of the lure.

A still further objective of the present invention is to provide a fishing lure body which incorporates hook retainers that will allow a simple means to attach and remove hooks of preselected weights without the aid of special tools.

It is a further objective of the present invention to provide a fishing lure system incorporating a plurality of hooks having different weights which may be attached to the fishing lure by a means similar to that described in U.S. Pat. Nos. 4,095,315 and 4,112,608.

SUMMARY OF THE INVENTION

The invention disclosed herein is a fishing lure system wherein the lure body includes a coupling means based upon the principle of a spring member positioned within a bore in a body so that one end is positioned down the bore and adjacent to one side thereof and the other end is affixed to the opposite side and either near the surface of the body or on the surface of a body to create a hook hanger system whereby the user of the fishing lure may arbitrarily select hooks of predetermined density to cause the lure to function at predetermined depths. In a preferred embodiment of the invention, a bore is provided in the body of the fishing lure and a U-shaped spring steel wire is fastened to the body so that the bottom of the U protrudes from the surface and one leg of the U is not secured to the body but is positioned across and within the bore. The bore has a diameter slightly larger than the eye of the hooks utilized in the system so that any one of the hooks may be attached to the lure by inserting the eye into the bore and forcing it past the end of the U-shaped member. The spring tension of the U-shaped member allows it to be deflected as the end of the hook eye passes, twisting the hook causes the hook eye to loop around the end of the U so that when the hook is withdrawn the wire member passes through the eye and the hook is secured but may be removed from the lure body by reversing the procedure.

DESCRIPTION OF THE DRAWINGS

FIG. 1 is a fishing lure incorporating the connectors and weighted hooks of the present invention.

FIGS. 2A through 2D depict the sequence of placing a hook eye on the retainer.

FIGS. 3A through 3D depict the sequence of events required to remove a hook.

FIGS. 4A through 4D depict the sequence of events required to place a hook on the retainer when the retainer end is in close proximity to the bore bottom.

FIGS. 5 through 13 illustrate various embodiments of the connectors forming part of the present invention.

DESCRIPTION OF THE INVENTION

FIG. 1 illustrates a fishing lure incorporating the hook hanger disclosed in U.S. Pat. Nos. 4,095,315 and 4,112,608 supporting hooks 6 and 8 which are selected by the user from an assortment of hooks having different predetermined weights. The lure body 1 is provided with a bore 2 for each attachment means. These bores are generally cup-shaped and dimensioned to receive the free end 3 of the spring retainer 4. The other end, 5, of the U-shaped spring retainer means 4 is secured to the body 1 of the lure. In a preferred embodiment the U-shaped spring connector 4 is fabricated from spring steel wire but it may be fabricated from flat spring stock or a synthetic filament such as fiberglass, carbon filaments, boron filaments, etc. The hooks 6 and 8 are drawn from a large selection of hooks comprising the total lure system and their weight is a function of their size and in many cases the addition of heavy metal collars 9 secured to the hook shank by casting or crimping the metal about the hook.

FIGS. 2A, B, C and D illustrate the steps of connecting a hook eye to a preferred embodiment of the invention. In FIG. 2A the bore or cup 2 has a radius formed in the bottom dimensioned so that as the free end 3 of the spring retainer is forced toward the center of the bore it will not bind on the bottom. Thus when a hook eye 7 is placed between leg 3 and the wall of the bore as illustrated in FIG. 2A and pushed down as illustrated in FIG 2B the spring arm 3 is deflected toward the center of the bore as the hook eye 7 approaches the bottom of the bore 2. When the wire forming the hook eye passes the end of spring retainer leg 3 as in FIG. 2C, the spring retainer snaps toward the wall of bore 2 and enters the hook eye. The hook 7 may then be drawn out of the bore 2 as in FIG. 2D with the spring retainer passing through the hook eye securing it to the body 1.

Any attempt to remove the hook from the connector by pushing the hook into the bore 2 and pulling it out will fail to disconnect the hook eye from the connector 4. For instance in FIG. 2C note that when the hook is in the extreme down position the end of retainer leg 3 is still through the eye of the hook and if the hook is depressed even further it is stopped by the bottom of the bore and forced toward the center causing the retainer arm 3 to enter further into the eye.

FIGS. 3A, B, C and D illustrate the steps of removing a hook from the retainer. In FIG. 3A the hook 7 is positioned so that the eye is moved down the free leg 3 of the retainer spring it stops at the position shown in FIG. 3B, which is the same position as when the hook is installed in FIG. 2C. The eye is pressed against the wall of bore 2 and the end of spring retainer leg 3 is in the center of the eye. The hook eye is then twisted 90 degrees as illustrated in FIG. 3C. This causes one side of the hook eye to engage spring retainer arm 3 and create a fulcrum against which the hook eye may be rotated to snap it free from the end of the spring retainer leg 3. The hook eye becomes disengaged from the retainer as illustrated in FIG. 2C because the rotating motion of the hook eye deflects the end of the spring retainer arm 3 away from the wall of the bore 2, allowing the material of the hook eye to pass therebetween. Once the hook eye is free of the retainer it is removed by pulling it straight out of the bore 2 as illustrated in FIG. 3D.

FIGS. 4A, B, C and D illustrate an embodiment where the bore or cup 2 has a flat bottom and the spring retainer is positioned so that inward deflection by the hook eye closes the gap between the bottom of the cup and the end of the retainer leg 3. A hook 7 is inserted in this embodiment by sliding it down the wall of the bore as illustrated in FIG. 4A, twisting the hook past 90 degrees as illustrated in 4B and withdrawing the hook with the spring retainer arm through the eye as illustrated in FIG. 4D. The hook is removed by reversing the installation procedure, that is sliding the hook down the shaft of spring retainer arm 3 until it is in the position illustrated in FIG. 4C and rotating the shaft greater than 90 degrees and withdrawing it along the side of the spring arm 3 as illustrated in FIG. 4A.

FIG. 5 illustrates an alternate embodiment of the instant invention wherein the cup 2 has a flat bottom and the installation and removal procedures illustrated in FIGS. 4A through 4D are used. In this embodiment the free retaining spring leg 10 is relatively straight.

A further alternate of the embodiment illustrated in FIG. 5 may be provided where the cup 2 has a dome configuration as illustrated in FIGS. 2 and 3. In this case the hook is installed and removed as detailed with respect to FIGS. 2 and 3 previously discussed.

A still further embodiment using a spring retainer as illustrated in FIG. 5 may be obtained by configuring the bore 2 so that the flat bottom portion is spaced far enough away from the end of spring retainer leg 10 so that the hook eye may be pressed past the end of the leg. The leg will then snap into the eye as detailed in respect to FIGS. 2A through 2D and a similar installation and removal of a hook may be achieved.

FIG. 6 illustrates an alternate embodiment of the instant invention disclosing a spring retainer having a leg 20 wherein the end portion is bent at an angle of approximately 45 degrees. This embodiment may use any of the three different cups suggested with respect to FIG. 5 and similar removal and installation procedures must be utilized.

In the embodiment disclosed in FIG. 7, spring retainer leg 30 is in a modified "S" form. This embodiment of the spring retainer loop may be utilized with any of the three different types of bores or cups previously described with appropriate installation and removal procedures.

The embodiment illustrated in FIG. 8 utilizes a cup 41 which has an under cut portion 42 adapted to receive the end of spring retainer leg 40. In this embodiment the hook eye is placed against the wall of the bore so that when it is pushed straight down the spring retainer leg 40 is forced out of the under cut portion 42. As the eye passes the end of spring retainer leg 40, the end of the leg snaps through the hook eye and it may be withdrawn from the bore securely affixed to the body. This embodiment may utilize bottom configurations for the cups similar to those previously described but in the preferred embodiments the cup should be shallow enough so that the hook eye may not be pressed so far within the cup that the end of the spring retainer leg 40 snaps back out again.

The embodiment illustrated in FIG. 9 incorporates a spring retainer configured so that leg 50 curves back toward the secured leg and stops essentially against the wall of the bore adjacent to the secured leg. This embodiment may be adapted to use any of the three different configurations of cups previously discussed. The hook 7 is installed by placing the eye against the wall of the cup between the two legs of the spring retainer and proceeding as previously described.

FIG. 10 illustrates an embodiment of the present invention wherein the spring retainer loop has one end 60 bent at an angle of between 10 and 90 degrees but preferably less than 90 degrees toward the fixed leg. In this embodiment the end of the free leg 60 is positioned against the wall of the cup adjacent to the secured leg and the hook eye is installed by sliding it down the wall of the cup adjacent to the hook leg as illustrated.

FIG. 11 illustrates an embodiment which is similar to the embodiment described with respect to FIG. 10 except the bore 71 includes an under cut portion 72 adapted to receive an elongated, bent portion of the free end of spring retainer leg 70.

FIG. 12 illustrates a further embodiment of the invention which utilizes a single retaining rod. In this embodiment the retaining rod 90 is rigid and the cup 91 is provided with an under cut portion 92 and 93. One end of the rigid rod 90 is secured in the under cut portion 92 by a hinge pin 94. The rod is dimensioned so that the other end will swing within the under cut portion 93 but will be prevented from exiting the surface of the body as illustrated in FIG. 12. In this embodiment a hook is secured by the invention by forcing the hook into the bore so that the rigid arm swings toward the bottom of the bore. The bore must be held in a downward position so that gravity will cause the rigid arm to drop through the hook eye as one edge of the eye passes thereby. The hook is removed in this embodiment by rotating the hook eye 90 degrees when held in the bottom of the bore.

FIG. 13 illustrates an embodiment of the present invention where the spring retainer arm 80 is comprised of a single elongated member. In this embodiment one end of the elongated member is affixed in the body within and near the surface of the bore and the remaining portion of the elongated member 80 enters and crosses the bore as illustrated. This embodiment may use any of the three general cup shape bores previously described and appropriate removal and installation techniques are utilized.

The fishing lure system of the present invention is contemplated to consist of one or more lure bodies having different hydrodynamic shapes and a large number of hooks which may be selectively used with the various lure bodies. The hooks are of different dimensions and calibrated weights so that by properly selecting weighted hooks, a lure may be caused to have an effective density which will cause it to operate at the depth where the fish are feeding. It is further contemplated that hooks of different weights may be utilized along a lure body to cause hydrodynamic action of the lure to change. For instance, in FIG. 1 if hook 6 is a lightweight hook and hook 8 is a relatively heavy hook, the fishing lure will have a nose down attitude when it is at its equilibrium point in the water and its action will be abrupt and deep diving. Alternately, the heavier hook may be placed at the rear of the lure with a lighter hook forward and the diving dart of the lure will be shallower and give the lure the impression of an injured minnow attempting to surface.

A complete fishing lure system includes a lure body incorporating hook hanger and a set of weighted fishing hooks. The hook weights are calibrated and selected so that when they are attached to the lure, the lure will have a buoyancy equilibrium at various steps from the deepest level at which fish can be expected up to the surface. In a preferred embodiment, the fishing lure system would include a lure body such as illustrated in FIG. 1 and 2 sets of 10 calibrated hooks calculated to cause the lure to operate at depths between 100 feet and the surface, depending on which hooks were attached to the lure body.

Although preferred embodiments of this invention have been illustrated and described, variations and modifications may be apparent to those skilled in the art. Therefore I do not wish to be limited thereto and ask that the scope and breadth of this invention be determined from the claims which follow rather than the above description.

What I claim as a new and useful contribution to the art and for which I desire Letters Patent is:

1. A fishing lure system, comprising:
   a set of fishing hooks including a plurality of interchangable hooks each of which includes a calibrated weight in the form of a collar affixed to said hook for adjusting its effective weight;
   a lure body; and
   a hook hanger for attaching a selected one of said hooks to said lure body for adjusting the effective density of said fishing lure system.

2. A fishing lure system as defined in claim 1 wherein said hook hanger comprises:
   a first bore penetrating the surface of said body;
   a second bore penetrating said body and an elongated retainer fabricated from a material having spring properties, said retainer including a secured end held rigidly within said body by the side walls of said second bore; and
   a free end positioned adjacent to the wall of said first bore so that elongated retainer descends into and crosses a majority of the diameter of said first bore.

3. A fishing lure as defined in claim 1, comprising first and second hook hangers wherein one of said hook hangers is located in the front of said lure body.

4. A fishing lure as defined in claim 2, wherein said elongated retainer has "U" shape configuration including an arcuate center portion.

5. A fishing lure as defined in claim 4, wherein said secured end is positioned to exit the surface of said body adjacent to said first bore so that said arcuate center portion forms a loop above the surface of said body.

6. A fishing lure as defined in claim 5, wherein said secured end and said free end of said retainer are parallel and oriented at an angle to the axis of said first bore.

7. A fishing lure as defined in claim 5, wherein said secured end and said free end of said retainer are parallel and oriented parallel to the axis of said first bore further including a bent portion at the end of said free end directed away from said secured end.

8. A fishing lure as defined in claim 7, wherein said first bore includes an under cut portion and said bent end is elongated and positioned to enter said under cut portion.

9. A fishing lure as defined in claim 5, wherein said free end is of serpentine configuration.

10. A fishing lure as defined in claim 5, wherein said free end descends from said arcuate section across the diameter of said first bore so that the end is adjacent to the wall of said first bore closest to said secured end.

11. A fishing lure as defined in claim 5, wherein said secured end and said free end of said retainer are parallel and along the axis of said first bore and said free end includes a portion bent toward said secured end and positioned adjacent to the wall of said first bore closest to said secured end.

12. A fishing lure as defined in claim 11, wherein said bore includes an under cut portion and said bent end is adapted to enter said under cut portion.

13. A fishing lure as defined in claim 5, wherein the end of said free end is positioned from the bottom of said first bore a predetermined distance calculated to permit one side of a loop or eyelet to pass thereby.

14. A fishing lure as defined in claim 5, wherein said first free end is positioned immediately adjacent to the bottom of said first bore to prevent a loop or eye from passing thereby.

* * * * *